Figure 1:
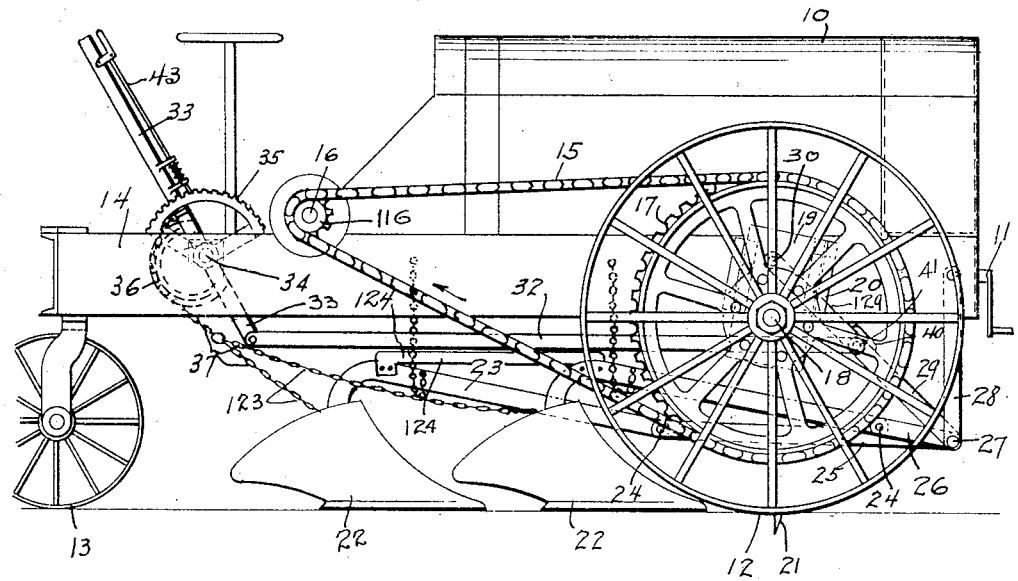

J. F. FULTON.
TRACTOR PLOW.
APPLICATION FILED MAY 6, 1916.

1,251,498.

Patented Jan. 1, 1918.

WITNESSES:

INVENTOR
James F. Fulton.
BY
Lockwood & Lockwood
ATTORNEY

UNITED STATES PATENT OFFICE.

JAMES F. FULTON, OF ANDERSON, INDIANA.

TRACTOR-PLOW.

1,251,498.             Specification of Letters Patent.             Patented Jan. 1, 1918.

Application filed May 6, 1916.   Serial No. 95,792.

*To all whom it may concern:*

Be it known that I, JAMES F. FULTON, a citizen of the United States, and a resident of Anderson, county of Madison, and State of Indiana, have invented a certain new and useful Tractor-Plow; and I do hereby declare that the following is a full, clear, and exact description thereof, reference being had to the accompanying drawings, in which like letters refer to like parts.

The object of this invention is to enable the plows which are in connection with a tractor to be drawn out of the ground without moving the tractor, and particularly to be drawn upward and rearward when being drawn out of the ground. This enables the plow points to be drawn out of the ground from under a root or other obstruction without moving the tractor. The further operation of the device raises the plows upwardly and rearwardly. In this manner the plows are not only elevated but held elevated when traveling and not plowing, or when on the road.

The foregoing object of the invention is accomplished by having a peculiar toggle joint link construction connected with the forward end of the beams of the plows for drawing the same, and means for controlling said toggle joint link construction, said means also being connected with the rear end of the plows so as to both withdraw the plows rearwardly and elevate them. Also, when it is desired to lower the plows into the earth this construction imparts a downward and forward movement whereby their ends will be forced under the surface of the earth.

The toggle joint construction is so arranged that when they are moved into the plowing position, the toggles will be rigid and will withstand the pull of the plows, as hereafter explained.

Another object of the invention is to so connect the plows to the frame of the tractor wheels that both of these will tend to throw the tractor frame and its weight downward for holding the tractor wheels more firmly upon the ground during the operation, and thus greatly increase the traction efficiency of the machine.

This last object is accomplished by hitching the forward ends of the plow beams to means connected with the tractor frame in advance of the tractor wheels, and said plow beams extend therefrom rearward to a point rearward of the traction wheel, so that the pull of the earth, as the plows are forced through it, is exerted in a downward direction upon the tractor frame in advance of the tractor wheels and therefore upon the tractor wheels themselves.

Coöperating with the foregoing is a downward strain or pull of the sprocket wheel which drives the traction wheels, the gears for driving the traction wheels being located to the rear of them and the sprocket chain running from the gears to the traction wheels so that the sprocket chain would actuate or pull the traction wheels from the lower part thereof, rearward and upwardly at an inclination to the driving means on the tractor frame, and thus pull downward on said tractor frame.

Figure 2:
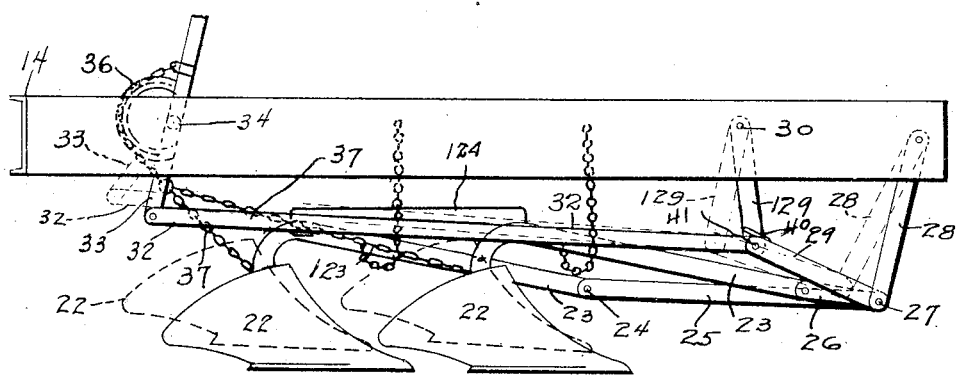

The full nature of this invention will be understood from the accompanying drawings and the following description and claims:

Figure 1 is a side elevation of the tractor with the plows connected in lowered position. Fig. 2 is the same as Fig. 1 with parts removed and showing the plows in partially elevated position in full lines, and in completely elevated position in dotted lines.

In the drawings there is shown a tractor having a motor hood 10, a motor crank 11, tractor wheels 12 one being located at each side of the tractor frame 14 and one of them traveling in the furrow.

There is also a steering wheel or trailer 13 at the rear end of the frame, and means not shown for steering said trailer. The trailer runs in the furrow and is swiveled, and the swivel frame is offset rearwardly substantially as shown so that during normal operation it will follow and need little or no steering.

The tractor wheels are mounted on spindles 18 which are secured to a plate or frame 19 which is vertically adjustable in and between a pair of guide bars 20 at both sides of the tractor frame, the vertical adjustment thereof being effected by means not shown. In this manner the tractor frame may be lowered or raised as required to maintain the tractor frame in a level position, allowing during operation one tractor wheel to run in the furrow and the other on the land.

The tractor wheels are driven from a driving shaft 16 mounted on the frame and carrying a sprocket wheel 116 over which a sprocket chain 15 operates and extends to a large sprocket wheel 17, which is secured to the traction wheel inside thereof. The driving shaft 16 and gear 116 are mounted on the traction frame to the rear of the traction wheels so that in operation the lower side of the sprocket chain will pull and transmit power to the tractor wheels and since it extends rearwardly and upwardly at an inclination from the lower part of the sprocket wheel 17 to the driving shaft 16, it is obvious that the pull of the traction wheels through the lower part of the sprocket chain is downward on the tractor frame.

There is secured to the rim of the tractor wheel which runs in the furrow a number of sub-soil spurs 21, only one of which is shown, projecting into the earth at the bottom of the furrow which stir the earth and loosen it so as to let the air penetrate it and thus gain the advantage in this way, which has heretofore been gained by sub-soil plows. To increase the efficiency of these sub-soil spurs the advancing edges are radial as shown in Fig. 1, while the other side is inclined substantially as shown in Fig. 1. This causes them to more effectually dig into and tear up the earth in the bottom of the furrow.

There is shown herein two plows 22, one to the rear and to one side of the other, and each has a beam 23, which beams 23 are parallel with each other but are connected together by a cross bar 124 at the rear end, and a bar 26 connects the end of each beam with the lower end of a draft rod 27 mounted in the ends of draft bars 28, which at their upper ends are pivoted to the frame of the tractor and in advance of the tractor wheels.

During the plowing operation the foregoing structure utilizes the pull of the plows in addition to the weight of the tractor for holding the tractor wheels down tightly upon the ground and increasing the traction efficiency. This result arises from the features of the construction above described.

The plow ends or shares are, during the plowing operation, running under the earth and are being drawn by the plow beams and therefore have a considerable downward pull or resistance which is transmitted to the frame through the plow beams and side chains 123.

Also, while the plows are located beneath the traction frame and behind the traction wheels, their draft connection with the traction frame is in front of the traction wheels so that the draft or pull of the plows on the traction frame is fully transmitted or exerted upon the traction wheels, which tends to draw the traction frame and wheels downward thus increasing the traction efficiency of the wheels on the earth.

In the third place, the pull of the sprocket wheel 17 on the traction wheels is downward on the traction frame, as this force is exerted through the lower side of the sprocket chain pulling downward on the driving shaft 16 on the traction frame, thus increasing the traction efficiency of the traction wheels on the earth, so as to make it needless to have cleats on the traction wheels to keep them from slipping.

When the plows, during operation, run under an obstruction, root, or the like and it is necessary to withdraw them, it is desirable to be able to do so without backing the machine, and this important object is accomplished by the following mechanism. As has been observed, the draft bars 28 and draft rods 27 are suspended from the traction frame, and during the plowing the lower end of this draft frame must be braced or prevented from rearward movement and held upright and forward, as shown in Fig. 1. This is done by a toggle plate composed of link members 29 and 129, which at their lower ends are pivoted to the draft bars 27 and at their upper ends to the frame 30. There are locking projections 40 extending from the inner end of each link 29 and 129 adapted to overlap the rearward surfaces of the companion link so that when the links 29 and 129 are forced into a straight position or in alinement with each other, as in Fig. 1, they will form an absolutely rigid brace for holding the lower end of the draft in its downward and forward position.

The toggle links are on both sides of the machine and are pivoted together by a transverse pivot rod 41. A link bar 32 is connected with this pivot rod 41 and extends rearward to the lower end of a lever 33 which is fulcrumed between its ends to the frame at 34 and has a handle on its upper end whereby when this upper end of said lever is drawn rearward, the connecting bar 32 will force the toggle links 29 and 129 into the straight and rigid bracing position as shown in Fig. 1, and hold them in such position.

A sheave cam 36 is secured to the lever 33 concentric with its fulcrum and a cable 37 operates on said sheave cam and is connected with the rear ends of both plows so as to draw said plows rearwardly and also elevate them, as will be explained. The lever 33 is locked into its actual position by a plunger 43 engaging a segmental rack 35 which is secured to the frame of the machine. Assuming that the machine is operating as shown in Fig. 1, and the plows have wedged beneath a root or other obstruction, and it is necessary to withdraw the plows, instead of backing the tractor, the upper end of the lever 33 is drawn forward to the position shown in Fig. 2, which through the bar 32, throws the toggle plate rearward and that and the lower links 29 of the toggle plate throw the draft rod 27 rearward. This bends the toggle plate and enables the plows to be drawn rearward and at the same time, and by the same operation of the lever 33, the plows are drawn rearward by the cable 37.

During the first part of this process, the plows will be drawn backward, but during the latter part of the process or operation of the lever 33, the cable 37 will elevate the plows to the dotted line position as shown in Fig. 2, and during such operation the plows will move simultaneously upward and rearward as indicated. Hence the first withdrawal removes the plow plates from beneath the obstruction, while the second part of the withdrawal movement further withdraws and at the same time elevates the plows, and when thus elevated they will be supported in their elevated position by the cable 37, and the toggle plates and draft frame combined and coöperating, as explained, will permit this action. The foregoing means, it is to be observed, withdraws the plows in substantially the same way that the ordinary walking plow is withdrawn from under a root by pulling and lifting on the handle, and this is all done in the present machine at one time and with one hand lever and without reversing the tractor.

The invention claimed is:

1. The combination with a plow carriage, and a plow, of means on the carriage for moving said plow directly backward before raising it from the ground, and then withdrawing it therefrom rearwardly and upwardly, and draft means for hitching said plow to the carriage which permits such movement thereof.

2. The combination with a plow carriage, and a plow, having a beam, of means on the carriage for withdrawing said plow rearward from the ground, a flexible connection between the plow beam and carriage, and releasable bracing means for holding said flexible connection in fixed position while the device is plowing.

3. The combination with a plow carriage, and a plow, having a beam, of means on the carriage for withdrawing said plow rearward from the ground, a flexible connection between the plow beam and carriage, and releasable bracing means for holding said flexible connection in fixed position while the device is plowing, and adapted to yield when the plow is drawn rearward.

4. The combination with a plow carriage, and a plow, of means on the carriage for withdrawing said plow rearward from the ground, a draft bar pivoted at one end to the plow beam and at the other end to the carriage, and releasable bracing means for holding said draft bar in rigid position while plowing and adapted to yield when the plow is drawn rearward.

5. The combination with a plow carriage, and a plow, having a beam, of means on the carriage for withdrawing said plow rearward from the ground, a flexible draft connection between the plow beam and carriage, toggle links pivoted at one end to the carriage and at the other end at the lower end of the draft connection, and means for holding said toggle links in a rigid position in alinement with each other while plowing and for releasing said toggle links when desired.

6. The combination with a plow carriage, and a plow, having a beam, of means on the carriage for withdrawing said plow rearward from the ground, a flexible draft connection between the plow beam and tractor, releasable bracing means for holding said draft connection in fixed position while the device is plowing, and a connection between said bracing means and the plow withdrawing means for releasing said brace for permitting the withdrawal of the plow.

7. The combination with a plow carriage, and a plow, having a beam, of means on the carriage for withdrawing said plow rearward from the ground, a draft connection between the plow beam and carriage, toggle links pivoted at one end to the carriage and at the other end at the lower end of the draft connection and a bar connecting with the toggle joint and with the plow withdrawing means for releasing said toggle links and permitting the withdrawal of the plow.

8. The combination with a plow carriage, and a plow having a beam of a lever actuated mechanism mounted on the carriage, a connection between said lever actuated mechanism and the plow for withdrawing the plow from the ground, a flexible draft connection between the plow beam and carriage, toggle links pivoted at one end to the carriage and at the other end at the lower end of the draft connection and a bar pivoted at one end to said lever actuated mechanism, substantially as set forth.

9. The combination with a tractor, and a plow having a beam, of a hand operated lever mounted on said carriage between its end, a cam actuated by said lever, flexible means secured to said cam and passing over the periphery thereof and connected with the plow for withdrawing the same from the ground, a flexible draft connection between the plow beam and carriage, toggle links pivoted at one end to the carriage, and at the other end at the lower end of the draft connection, and a bar pivoted at one end to the toggle joint and at the other end to said lever.

In witness whereof, I have hereunto affixed my signature in the presence of the witnesses herein named.

JAMES F. FULTON.

Witnesses:
ROBERT W. WEBB,
GEORGE W. DAVIS.

Copies of this patent may be obtained for five cents each, by addressing the "Commissioner of Patents, Washington, D. C."